(12) United States Patent
Lee et al.

(10) Patent No.: US 10,450,045 B2
(45) Date of Patent: Oct. 22, 2019

(54) FUEL SUPPLY APPARATUS OF LIQUEFIED GAS CARRIER AND FUEL SUPPLY METHOD THEREOF

(75) Inventors: Joong-nam Lee, Gyeongsangnam-do (KR); Ki-hun Joh, Gyeongsangnam-do (KR); Ho-byung Yoon, Gyeongsangnam-do (KR); Mun-keun Ha, Gyeongsangnam-do (KR); Kyu-dong Jung, Gyeongsangnam-do (KR)

(73) Assignee: Samsung Heavy Ind. Co., Ltd. (KR)

( * ) Notice: Subject to any disclaimer, the term of this patent is extended or adjusted under 35 U.S.C. 154(b) by 1054 days.

(21) Appl. No.: 12/519,414

(22) PCT Filed: Dec. 18, 2007

(86) PCT No.: PCT/KR2007/006639
§ 371 (c)(1),
(2), (4) Date: Jun. 16, 2009

(87) PCT Pub. No.: WO2008/075882
PCT Pub. Date: Jun. 26, 2008

(65) Prior Publication Data
US 2010/0089072 A1    Apr. 15, 2010

(30) Foreign Application Priority Data
Dec. 18, 2006  (KR) .................. 10-2006-0129103

(51) Int. Cl.
*F17C 9/02* (2006.01)
*B63J 99/00* (2009.01)
*F17C 3/02* (2006.01)

(52) U.S. Cl.
CPC .............. *B63J 99/00* (2013.01); *F17C 3/025* (2013.01); *B63J 2099/003* (2013.01);
(Continued)

(58) Field of Classification Search
CPC .. F17C 3/005; F17C 3/025; F17C 9/02; F17C 2265/037; F17C 2265/066
(Continued)

(56) References Cited

U.S. PATENT DOCUMENTS 3,252,480 A * 5/1966 Odendahl et al. ......... 137/625.3
3,857,251 A * 12/1974 Alleaume ................. F17C 9/04
62/47.1
(Continued)

FOREIGN PATENT DOCUMENTS

DE    32 45 865    4/1984
EP    0 069 717    1/1983
(Continued)

OTHER PUBLICATIONS

English translation of FR2851301.*
(Continued)

*Primary Examiner* — Tareq Alosh
(74) *Attorney, Agent, or Firm* — Harness, Dickey & Pierce, P.L.C.

(57) ABSTRACT

A fuel supply apparatus of a liquefied gas carrier includes: a compressor for compressing gas fuel into a high pressure; a compressed gas storage tank being filled with the compressed high-pressure gas fuel, for storing the gas fuel; and a decompressor for decompressing the high-pressure gas fuel drawn from the compressed gas storage tank into a pressure suitable to be used in a propulsion system, to supply fuel to the propulsion system. The gas fuel is at least one of a natural boiled-off gas which is naturally evaporated in the cargo tank, a forced boiled-off gas which is artificially evaporated, and a gas additionally supplied for the use of fuel. Further, the compressor is a multistage high-pressure compressor and the decompressor is a multistage decompressor.

10 Claims, 7 Drawing Sheets

(52) U.S. Cl.
CPC .. *F17C 2201/052* (2013.01); *F17C 2205/013* (2013.01); *F17C 2205/0142* (2013.01); *F17C 2205/0338* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2227/0164* (2013.01); *F17C 2260/042* (2013.01); *F17C 2265/037* (2013.01); *F17C 2265/066* (2013.01); *F17C 2265/07* (2013.01); *F17C 2270/0105* (2013.01); *Y02T 70/5263* (2013.01)

(58) Field of Classification Search
USPC .................................. 62/50.2, 50.3, 87, 402
See application file for complete search history.

(56) References Cited

U.S. PATENT DOCUMENTS

| | | | |
|---|---|---|---|
| 4,924,822 A | | 5/1990 | Asai et al. |
| 5,163,409 A | * | 11/1992 | Gustafson ........... F02D 19/0647 123/525 |
| 5,477,690 A | * | 12/1995 | Gram ............................ 62/45.1 |
| 5,540,208 A | * | 7/1996 | Kikutani ................ F02B 43/00 123/518 |
| 5,590,535 A | | 1/1997 | Rhoades |
| 5,845,479 A | * | 12/1998 | Nakhamkin .............. F02C 6/16 60/727 |
| 5,884,488 A | | 3/1999 | Gram et al. |
| 6,153,943 A | * | 11/2000 | Mistr, Jr. .................. F02C 6/16 290/52 |
| 6,267,069 B1 | * | 7/2001 | Keehan ........................ 114/74 A |
| 7,032,390 B2 | * | 4/2006 | Brodreskift ............... F17C 5/02 62/48.2 |
| 8,322,357 B2 | * | 12/2012 | Chen ............................... 137/14 |
| 8,499,569 B2 | * | 8/2013 | Van Tassel ..................... 62/48.2 |
| 2003/0172661 A1 | * | 9/2003 | Yaroslavovich et al. ......... 62/87 |
| 2008/0008602 A1 | * | 1/2008 | Pozivil et al. ................. 417/243 |

FOREIGN PATENT DOCUMENTS

| | | | | |
|---|---|---|---|---|
| EP | 1291576 A2 | | 3/2003 | |
| EP | 1 596 122 | | 11/2005 | |
| FR | 2 851 301 | | 8/2004 | |
| FR | 2851301 A1 | * | 8/2004 | ............ F02M 21/02 |
| JP | 06-054101 B2 | | 7/1994 | |
| JP | 2004-051049 | | 2/2004 | |
| JP | 2006-177618 | | 7/2006 | |
| KR | 10-2006-0047881 A | | 5/2006 | |
| WO | WO-05/058684 A1 | | 6/2005 | |

OTHER PUBLICATIONS

English translation of FR 2,851,301 provided by Espacenet. Feb. 2017.*
Certified English translation of FR 2851301 A1 (previously cited), provided by USPTO. Mar. 2019. (Year: 2019).*
The Japanese Office Action dated Oct. 25, 2011.
The extended European search report dated Apr. 13, 2011.

* cited by examiner

[Fig. 1]
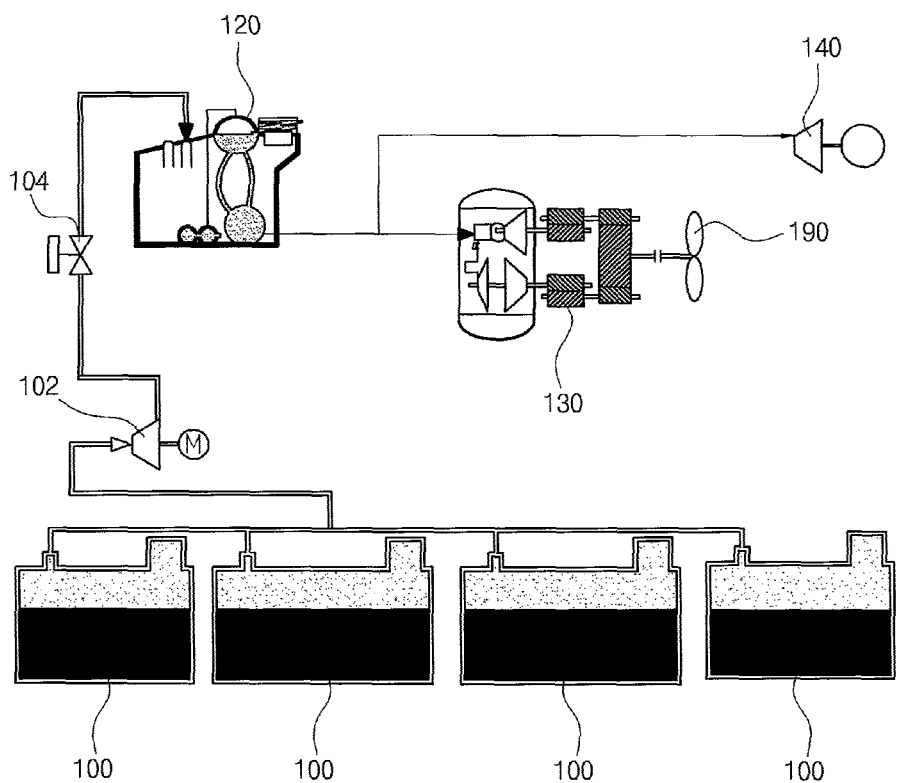

[Fig. 2]
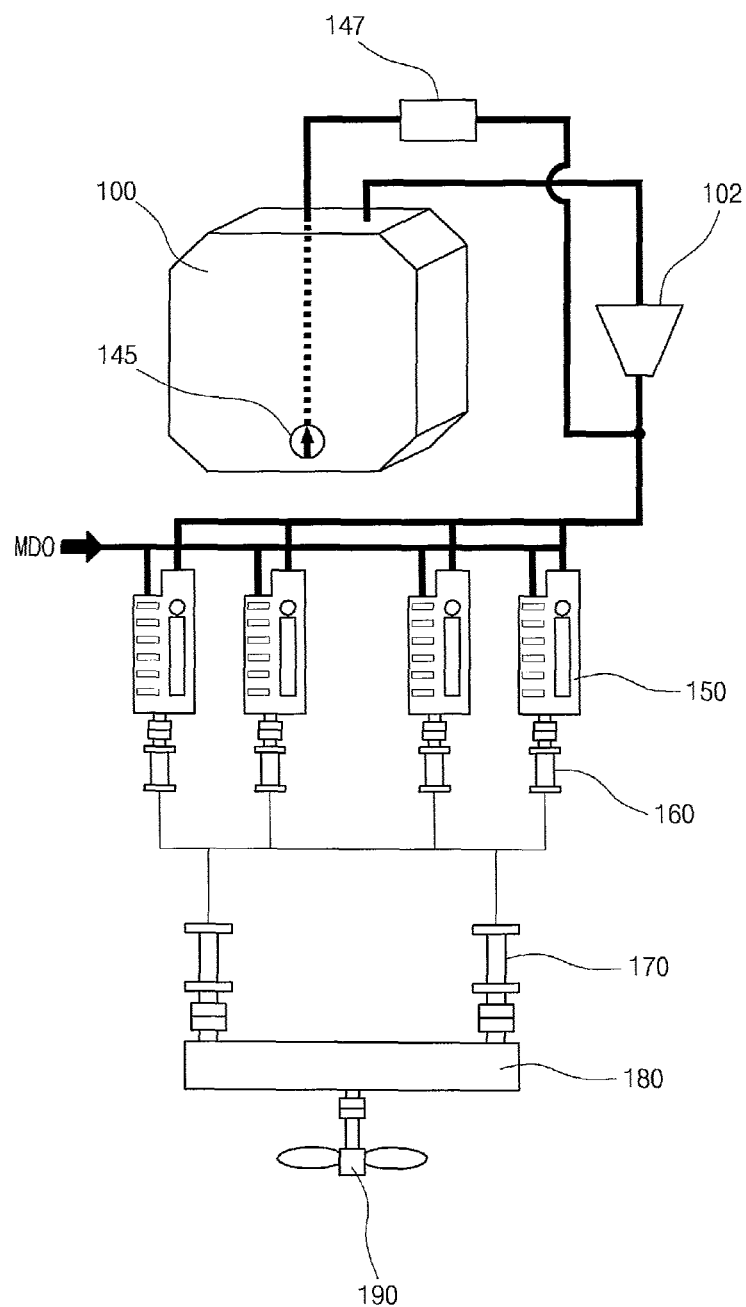

[Fig. 3]
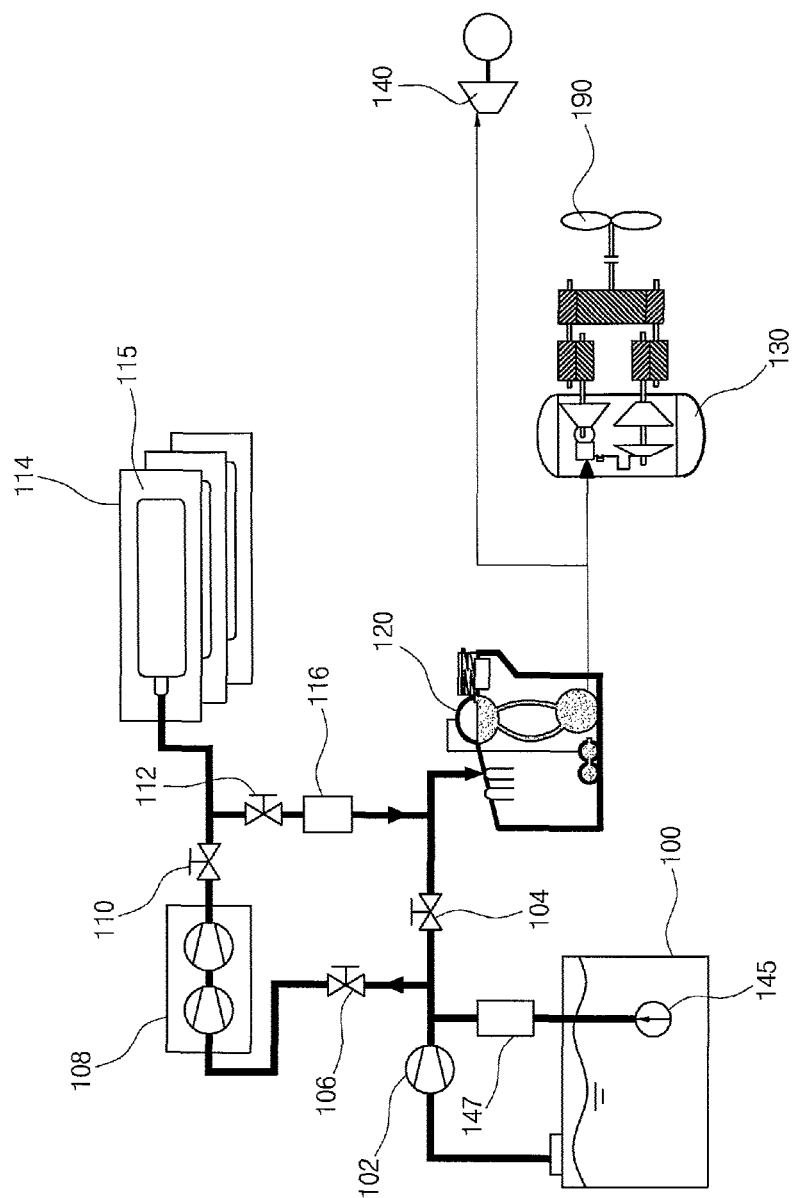

[Fig. 4]
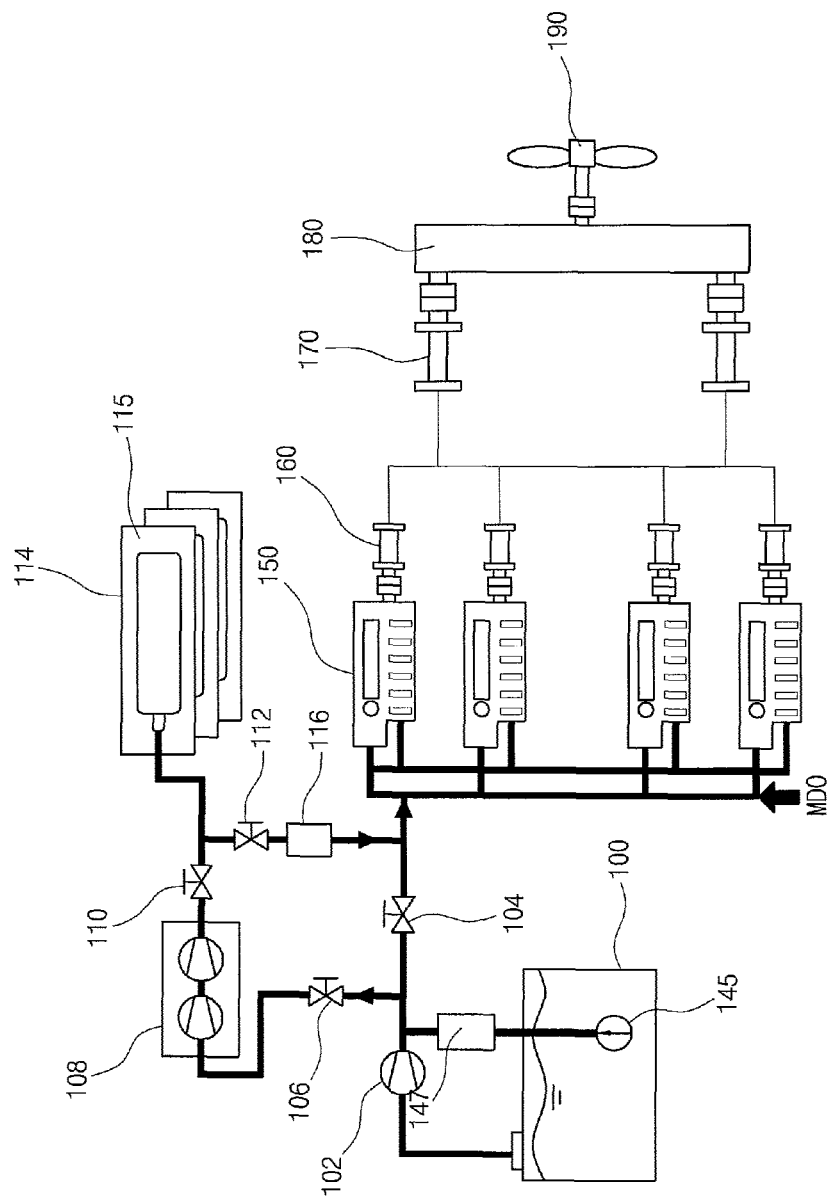

[Fig. 5]
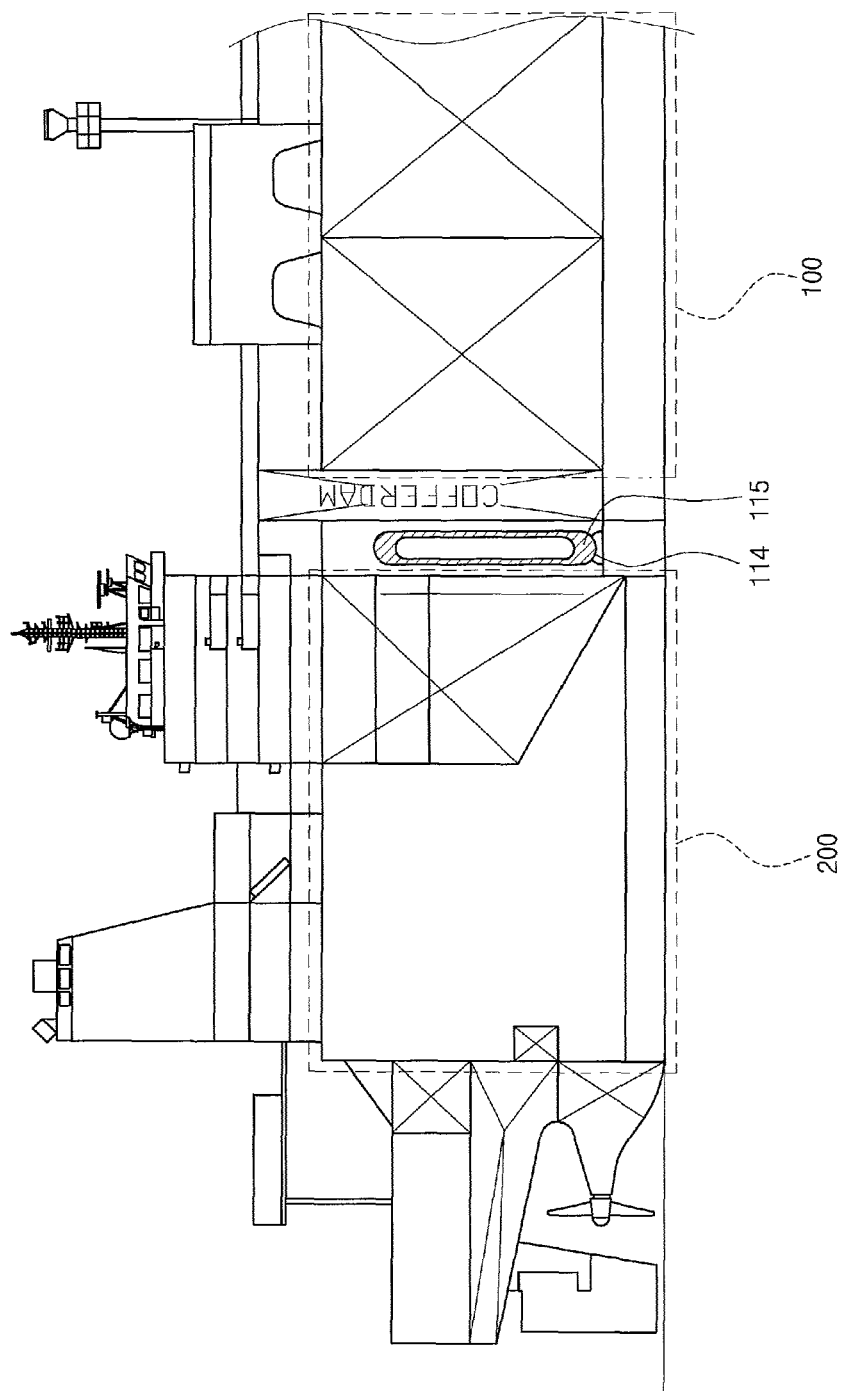

[Fig. 6]
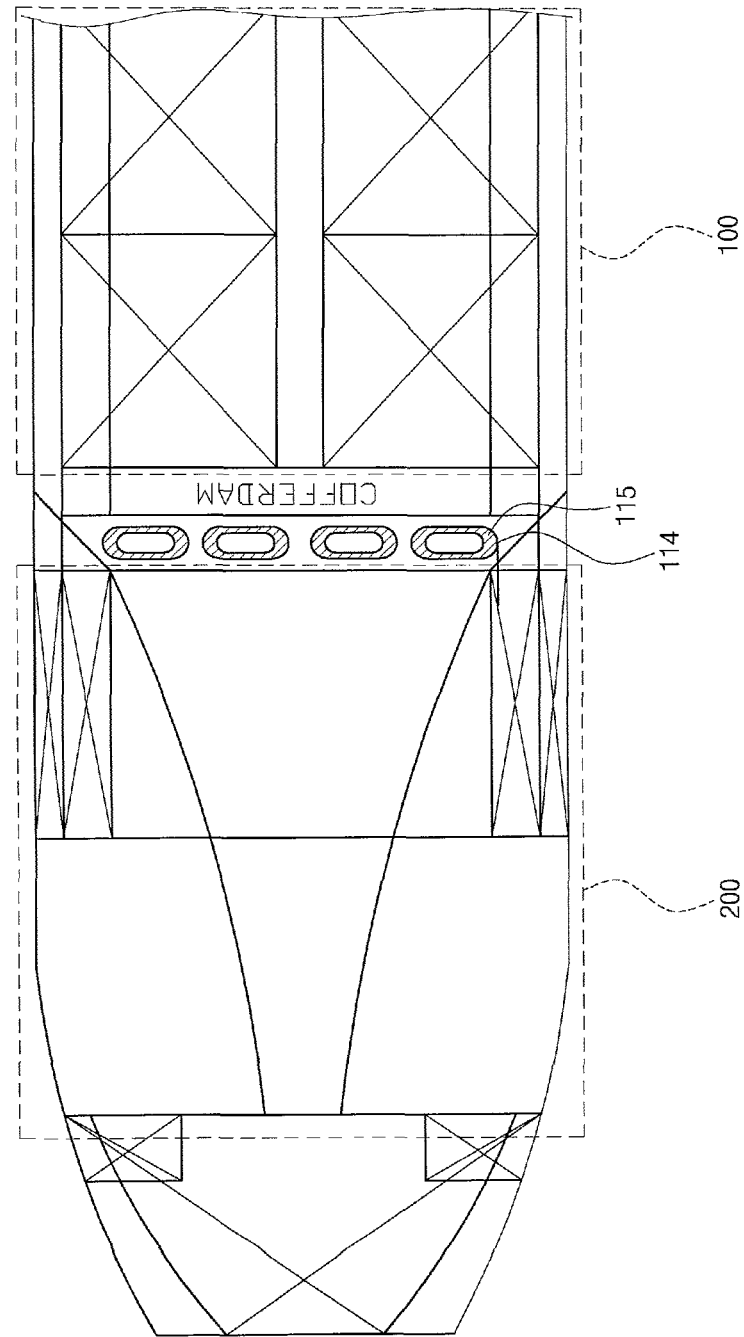

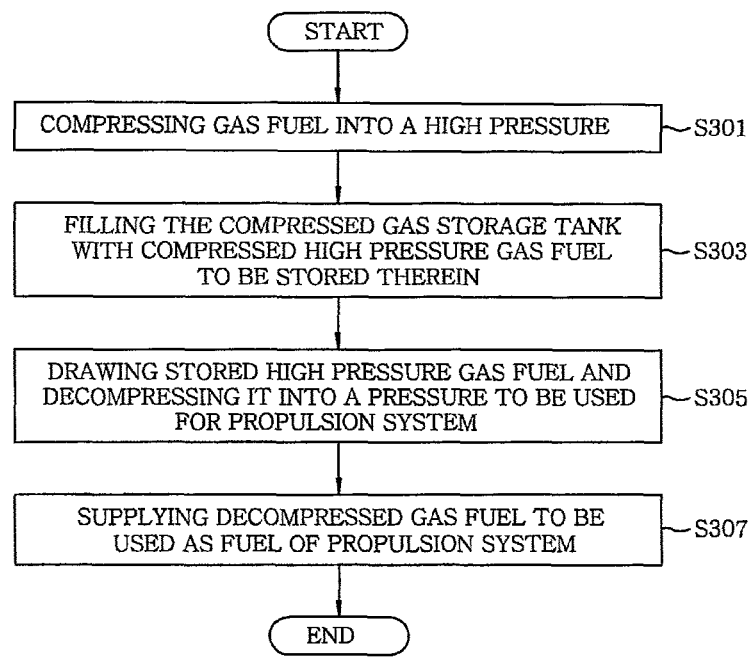
[Fig. 7]

FUEL SUPPLY APPARATUS OF LIQUEFIED GAS CARRIER AND FUEL SUPPLY METHOD THEREOF

TECHNICAL FIELD

The present invention relates to a fuel supply apparatus of a liquefied gas carrier and a fuel supply method thereof and, more particularly, to a fuel supply apparatus of a liquefied gas carrier and a fuel supply method thereof for compressing a natural gas which is a naturally or artificially evaporated gas in a cargo tank or an additionally supplied gas to be used as fuel into a high pressure and storing the natural gas, and decompressing the stored natural gas to be used as fuel of a propulsion system when necessary.

BACKGROUND ART

In general, LNG (liquefied natural gas) or LPG (liquefied natural gas) is employed as a liquefied gas to be used as fuel. The liquefied gas is generally contained in a cargo tank of a liquefied gas carrier, to be carried.

During carriage of the liquefied gas, a small quantity of the liquefied gas partially and naturally evaporates in a cargo tank due to an increase of the inside energy of the liquefied gas caused by movement of the liquefied gas and a temperature difference of the liquefied gas from the outside air. Such an evaporated gas is called natural boiled-off gas.

The natural boiled-off gas can be used as fuel of the liquefied gas carrier when the liquefied gas carrier is operated. However, the natural boiled-off gas is continuously accumulated in the cargo tank when the liquefied gas carrier is moored or anchored, to increase a pressure inside the cargo tank, so that various accidents such as a crack or explosion of the cargo tank occur.

Generally, the liquefied gas carrier may be largely classified, according to a propulsion mode, into two types: a liquefied gas carrier propelled by a steam turbine, and a liquefied gas carrier propelled by electric power.

FIG. 1 schematically illustrates a conventional propulsion device of a liquefied gas carrier propelled by a steam turbine. As shown in FIG. 1, the propulsion device includes: a cargo tank 100 for storing therein a liquefied natural gas; a boiled-off gas compressor 102 for compressing gas fuel supplied from the cargo tank 100; a gas blocking valve 104 for blocking supply of the gas fuel in an emergency, being connected with the Boiled-off gas compressor 102; a boiler 120 for receiving the gas fuel compressed by the boiled-off gas compressor 102 and generating steam of high temperature and high pressure; a turbine 130 driven by the steam of high temperature and high pressure supplied from the boiler 120; a propeller 190 turning by a driving force from the turbine 130; and a regular electric power generator 140 driven by using the steam of high temperature and high pressure and generating electric power. In the liquefied gas carrier propelled by the steam turbine, the propulsion device drives the turbine 130 by using the steam of high temperature and high pressure generated in the boiler 120 and generates a propulsive force by turning the propeller 190. Further, the regular electric power generator 140 is driven by using the steam of high temperature and high pressure generated in the boiler 120 to generate the regular electric power required for a ship (for example, the power for a living space in the ship).

FIG. 2 is a schematically describes a conventional propulsion device of a liquefied gas carrier propelled by electric power. In FIG. 2, a duel fuel engine 150 is mounted to the propulsion device. The duel fuel engine 150 may use any one of MDO (marine diesel oil) and gas fuel such as a natural boiled-off gas and a forced boiled-off gas, as fuel. The propulsion device with the duel fuel engine 150 of the liquefied gas carrier propelled by electric power includes: a boiled-off gas compressor 102 for compressing a natural boiled-off gas supplied from a cargo tank 100; a fuel pump 145 for forcing a liquefied gas out of the cargo tank 100; a forcing vaporizer 147 for artificially evaporating the liquefied gas from the cargo tank 100; a main electric power generator 160 for generating electric power by driving the duel fuel engine 150; a motor 170 rotatively driven by the generated electric power; a reducer 180 converting a rotating force of the motor 170 into the proper number of times of rotation and the torque; and a propeller 190 turning by the rotating force of the motor 170 and generating a propulsive force.

The aforementioned conventional liquefied gas carriers respectively propelled by the steam turbine and electric power can use the gas fuel artificially evaporated or generated during the operation as for the fuel of their respective propulsion systems. However, when the liquefied gas carriers are moored or anchored, the propulsion systems in conventional liquefied gas carriers does not need to be operated in full service condition, therefore, the accumulated fuel of gas is wasted by using a dumping device or burnt up by using a gas burner, in order to regulate the pressure inside of the cargo tank.

As mentioned above, the conventional liquefied gas carriers cause many problems, such as energy waste and economical loss thereby.

DISCLOSURE OF INVENTION

Technical Problem

In view of the above, the present invention provides a fuel supply apparatus of the liquefied gas carrier and a fuel supply method thereof for temporarily storing remaining gas fuel at high pressure wherein the remaining gas fuel is a naturally evaporated gas in a cargo tank or an additionally supplied gas to be used as fuel, and decompressing the stored gas to be used as fuel of a propulsion system when fuel supply is required.

Technical Solution

In accordance with a first embodiment of the present invention, there is provided a fuel supply apparatus of a liquefied gas carrier, including: a compressor for compressing gas fuel into a high pressure; a compressed gas storage tank being filled with the compressed high-pressure gas fuel, for storing the gas fuel; and a decompressor for decompressing the high-pressure gas fuel drawn from the compressed gas storage tank into a pressure to be used in a propulsion system, to supply fuel to the propulsion system.

It is preferable that the fuel supply apparatus further includes: a first valve of a first pipe from the cargo tank to the propulsion system; a second valve of a second pipe which is divided from the first pipe connected to the compressor; a third valve of a third pipe from the compressor to the compressed gas storage tank; and a fourth valve of a fourth pipe which is divided from the third pipe and connected to the decompressor.

The gas fuel may be at least one of a natural boiled-off gas naturally evaporated in the cargo tank, a forced boiled-off gas which is artificially evaporated, and a gas additionally supplied for the use of fuel.

Further, the compressed gas storage tank may be disposed in a space between an engine room of the liquefied gas carrier and the cargo tank.

Further, the compressor is a multistage high-pressure compressor.

Further, the compressed gas storage tank may include an explosion-proof film disposed at the outside thereof, to prevent an accident by explosion of the high-pressure gas fuel in an emergency.

Further, the decompressor is a multistage decompressor.

In accordance with a second embodiment of the present invention, there is provided a fuel supply method of a liquefied gas carrier, including: compressing gas fuel into a high pressure; filling the compressed gas storage tank with the compressed high-pressure gas fuel to be stored therein; drawing the stored high-pressure gas fuel and decompressing the gas fuel into a pressure to be used for a propulsion system when fuel supply is required; and supplying the decompressed gas fuel to the propulsion system to be used as a fuel.

The gas fuel may be at least one of a natural boiled-off gas naturally evaporated in the cargo tank, a forced boiled-off gas which is artificially evaporated, and a gas additionally supplied for the use of fuel.

Advantageous Effects

In accordance with the fuel supply apparatus of a liquefied gas carrier and the fuel supply method thereof, the remaining boiled-off gas, forced boiled-off gas, or a small quantity of the gas fuel separately supplied for the use of fuel is compressed into a high pressure and stored, and the compressed gas or gas fuel is decompressed to be used as the fuel of the propulsion system when necessary. Therefore, in the present invention, the waste of the boiled-off gas for the regulation of the pressure inside the cargo tank is not required, and the oil fuel (for example, DO, HFO, and the like) to be used as the fuel of the propulsion system is saved, whereby the liquefied gas carrier in accordance with the present invention can be highly competitive.

Furthermore, in accordance with the fuel supply apparatus of a liquefied gas carrier and the fuel supply method thereof, burning out the boiled-off gas for the regulation of the pressure inside the cargo tank is not required, so that the environment problems caused by great amounts of hazardous gas production can be prevented.

While the invention has been shown and described with respect to the preferred embodiments, it will be understood by those skilled in the art that various changes and modifications may be made without departing from the spirit and scope of the invention as defined in the following claims.

BRIEF DESCRIPTION OF THE DRAWINGS

The objects and features of the present invention will become apparent from the following description of preferred embodiments given in conjunction with the accompanying drawings, in which:

FIG. 1 is a schematic view illustrating a conventional propulsion device of a liquefied gas carrier propelled by a steam turbine;

FIG. 2 is a schematic view describing another conventional propulsion device of a liquefied gas carrier propelled by electric power;

FIG. 3 is a block diagram providing a fuel supply apparatus of a liquefied gas carrier in accordance with an embodiment of the present invention, which is applied to a liquefied gas carrier propelled by a steam turbine;

FIG. 4 is a block diagram showing the fuel supply apparatus of FIG. 3, which is applied to a liquefied gas carrier propelled by electric power;

FIG. 5 is a schematic view partially illustrating a side of the liquefied gas carrier having the fuel supply apparatus of FIG. 3;

FIG. 6 is a schematic view partially showing a plan of the liquefied gas carrier having the fuel supply apparatus of FIG. 3; and FIG. 7 is a flow chart describing a fuel supply method of a liquefied gas carrier in accordance with another embodiment of the present invention.

BEST MODE FOR CARRYING OUT THE INVENTION

Embodiments of the present invention will now be described with reference to the accompanying drawings for FIGS. 3 to 6 which form a part hereof.

FIG. 3 is a block diagram illustrating a fuel supply apparatus of a liquefied gas carrier in accordance with an embodiment of the present invention which is applied to a liquefied gas carrier propelled by a steam turbine. Further, FIG. 4 is a block diagram illustrating the fuel supply apparatus of FIG. 3 applied to a liquefied gas carrier propelled by electric power. Further, FIG. 5 is a schematic view illustrating a part of a side view of the liquefied gas carrier onto which the fuel supply apparatus of FIG. 3 is mounted, and FIG. 6 is a schematic view illustrating a part of a plan view of the liquefied gas carrier onto which the fuel supply apparatus of FIG. 3 is mounted. Further, FIG. 7 is a flow chart describing a fuel supply method of a liquefied gas carrier in accordance with an embodiment of the present invention.

FIG. 3 shows a fuel supply apparatus of a liquefied gas carrier applied to a liquefied gas carrier driven by a steam turbine. In this embodiment, the fuel supply apparatus has: a compressor 108 for compressing gas fuel, such as a natural or a forced boiled-off gas, into a high pressure; a compressed gas storage tank 114 for storing the compressed high pressure gas fuel filling the compressed gas storage tank 114; and a decompressor 116 for decompressing the stored high-pressure gas fuel when fuel supply is required.

The gas fuel, such as a boiled-off gas compressed into a fuel condition pressure (approximately, 6.5 bar) by a boiled-off gas compressor 102 or a artificially evaporated gas generated by a fuel pump 145 and a forcing vaporizer 147, can be used as fuel of a propulsion system (wherein the propulsion system refers to the system related to the generation of a driving force of a ship, i.e., the propulsion system driven by electric power refers to a set including an engine, a generator, a motor, a reducer, a propeller and the like, while the propulsion system propelled by the steam turbine refers to a set including a boiler, a turbine, a propeller, a generator and the like).

That is, when the liquefied gas carrier is in operation, the propulsion system requires fuel continuously. At this time, the gas fuel can be used for fuel of the propulsion system by opening a first valve 104 of a pipe connected to the propulsion system and closing a second valve 106 of a pipe connected to the compressor 108, the compressed gas storage tank 114 and the decompressor 116 which are the elements of the embodiment.

However, when the liquefied gas carrier is not operated but moored or anchored, the propulsion system does not require the fuel. Therefore, the first valve 104 is closed to stop the supply of the gas fuel into the propulsion system, and the second valve 106 is opened to introduce the generated gas fuel into the compressor 108.

The compressor 108 is a device for compressing the introduced gas fuel into a high pressure. The compression rate of the compressor 108 may slightly vary according to exemplary embodiments. However, it is preferable to use a multistage compressor for a stable performance with a great compression rate.

The gas fuel compressed into a high pressure by the compressor 108 fills the compressed gas storage tank 114 and is stored therein by opening a third valve 110 and closing a fourth valve 112.

The compressed gas storage tank 114 is capable of being filled with the gas fuel compressed into a high pressure and storing the gas fuel. The capacity of the compressed gas storage tank 114 may be decided in consideration of taking time for loading and unloading while the liquefied gas carrier is moored or anchored. Therefore, it is preferable that the compressed gas storage tank 114 has the capacity capable of storing all the boiled-off gas generated in the cargo tank 100 while the liquefied gas carrier is moored or anchored. A single large tank or a plurality of medium and small tanks connected with each other may be employed as the compressed gas storage tank 114.

An explosion-proof film 115 may be provided at the outside of the compressed gas storage tank 114. The explosion-proof film 115 is a protection film device which can be installed inside or outside of a case of the compressed gas storage tank 114. The explosion-proof film 115 may be formed of steel materials, and it protects people or facilities around the compressed gas storage tank 114 from the fragments produced when the compressed gas storage tank 114 explodes.

Further, the high pressure fuel of gas filling the compressed gas storage tank 114 and stored therein is decompressed into a proper pressure to be used in the propulsion system and can be supplied when fuel supply is required. At this time, the decompressor 116 decompresses the gas fuel. By closing the third valve 110 on a pipe connected to the compressor 108 and opening the fourth valve 112 on a pipe to the decompressor 116, the high-pressure fuel of gas in the compressed gas storage tank 114 is introduced into the decompressor 116.

The decompressor 116 is a device for decompressing the high-pressure gas fuel into a pressure proper to be used for the propulsion system, therefore, it is preferable to employ a multistage decompressor for stably performing even if a pressure rate is great. In this embodiment, a multistage decompression valve of self-control type is employed, so that a droop phenomenon occurring during a normal operation can be reduced, comparing the other valves, and performance can be more stable. The multistage decompression valve of self-control type, which is not specifically illustrated, may include general elements such as a diaphragm, a seat, a disc, a strainer, a spring and the like.

When the liquefied gas carrier driven by the steam turbine, which has the fuel supply apparatus including the elements aforementioned, stops mooring or anchoring to start operating, the high-pressure gas fuel filling the compressed gas storage tank 114 and stored therein is decompressed by the decompressor 116 so that the gas fuel can be used as fuel of a boiler 120. Further, the boiled-off gas or the forcedly evaporated gas without processing of the compressor 108, the compressed gas storage tank 114 and the decompressor 116 can be also used as the fuel of the boiler 120.

By using high-pressure steam generated by operation of the boiler 120, a turbine 130 can be driven to drive a propeller 190, and a regular electric power generator 140 can be operated to generate electric energy to be used for inside the ship.

FIG. 4 illustrates an embodiment of the fuel supply apparatus described in FIG. 3, wherein the fuel supply apparatus is applied to a liquefied gas carrier propelled by electric power. The liquefied gas carrier propelled by the electric power shown in FIG. 4 uses the fuel supply apparatus having the same elements with the elements of the apparatus used for the liquefied gas carrier driven by the steam turbine shown in FIG. 3. Therefore, only different operations with that of the apparatus shown in FIG. 3 will be described.

When the liquefied gas carrier propelled by the electric power, which has the fuel supply apparatus including the elements aforementioned, stops mooring or anchoring and starts operating, i.e., when fuel supply to the propulsion system is required, the high-pressure gas fuel filling the compressed gas storage tank 114 and stored therein is decompressed by the decompressor 116, so that the gas fuel can be used for fuel of a duel fuel engine 150. Further, the natural boiled-off gas or the forced boiled-off gas without processing of the compressor 108, the compressed gas storage tank 114 and the decompressor 116 can be also used as for fuel of the duel fuel engine 150.

By the operation of the duel fuel engine 150, a main electric power generator 160 is driven to generate electric power. The generated electric power generates a proper driving force by using a motor 170 and a reducer 180, to rotate a propeller 190.

The liquefied gas carrier propelled by the electric power may use MDO (marine diesel oil) or gas fuel for fuel when the empty carrier is operated.

FIGS. 5 and 6 are schematic views respectively illustrating a side and a plan of the liquefied gas carrier having the fuel supply apparatus in accordance with the embodiment of FIG. 3.

As shown in FIGS. 5 and 6, the compressed gas storage tank 114 with the explosion-proof film 115 in accordance with the present embodiment is provided in a space between an engine room 200 and the cargo tank 100. The engine room 200 refers to the secured space for mounting the propulsion system, and the cargo tank 100 refers to the space for storing the liquefied gas, wherein the secured space for the compressed gas storage tank 114 is an extra space between the engine room 200 and the cargo tank 100. The secured space is preferable to be the extra space which does not disturb shell plating work of the ship and is capable of passing, and arranging pipes and performing maintenance of various kinds of equipment. However, the compressed gas storage tank 114 may be disposed anywhere on the ship.

FIG. 7 is a flow chart describing a fuel supply method of a liquefied gas carrier in accordance with an embodiment of the present invention.

As described in FIG. 7, the embodiment of the present invention includes a compression step S301 where gas fuel which artificially evaporates or naturally evaporates in the cargo tank, or additionally supplied to be used as fuel is compressed into a high pressure.

In this embodiment, a remaining natural boiled-off gas or forced boiled=off gas fills the compressed gas storage tank 114 and is stored therein, so that the liquefied gas carrier can use the stored gas as fuel by decompressing the stored gas when fuel supply is required. Additionally, the compressed gas storage tank 114 can also store therein the gas supplied for the use of fuel at a high-pressure. That is, when loading the gas fuel, a small quantity of the fuel of gas in a compressed gas state can be stored in the compressed gas storage tank 114 for the use of fuel, instead of being storing in a liquefied state in the cargo tank. Therefore, in the compression step S301, it is possible to compress all of the boiled-off gas, the forcing vaporized gas obtained by artificially evaporating the liquefied gas, and the small quantity of the fuel of gas which has not been stored in the liquefied state upon loading for the use of fuel. The multistage high-pressure compressor may be used in this step.

Subsequently, in a filling and storing step S303, the compressed high-pressure gas fuel fills the compressed gas storage tank and is stored therein. The gas fuel compressed into a high pressure in the compression step S301 is stored in the compressed gas storage tank 114 including the explosion-proof film 115 shown in FIG. 3.

Subsequently, in a decompression step S305, the high pressure gas fuel stored in the compressed gas storage tank is drawn and decompressed into a pressure to be used in the propulsion system. The multistage decompressor, such as the multistage decompression valve, may be used for compression of the high-pressure gas fuel.

Finally, in a fuel supply step S307, the decompressed gas fuel is supplied to be used for fuel of the propulsion system. When the fuel supply apparatus in accordance with the embodiment of the present invention is applied to the liquefied gas carrier propelled by the steam turbine, the decompressed gas fuel is used as fuel of the boiler to generate steam. When the fuel supply apparatus is applied to the liquefied gas carrier propelled by the electric power, the decompressed gas fuel is used as fuel of the duel fuel engine.

As described above, in accordance with the fuel supply apparatus of a liquefied gas carrier and the fuel supply method thereof, the remaining boiled-off gas, forced boiled-off gas, or a small quantity of the gas fuel separately supplied for the use of fuel is compressed into a high pressure and stored, and the compressed gas or gas fuel is decompressed to be used as the fuel of the propulsion system when necessary. Therefore, in the present invention, the waste of the boiled-off gas for the regulation of the pressure inside the cargo tank is not required, and the oil fuel (for example, DO, HFO, and the like) to be used as the fuel of the propulsion system is saved, whereby the liquefied gas carrier in accordance with the present invention can be highly competitive.

Furthermore, in accordance with the fuel supply apparatus of a liquefied gas carrier and the fuel supply method thereof, burning out the boiled-off gas for the regulation of the pressure inside the cargo tank is not required, so that the environment problems caused by great amounts of hazardous gas production can be prevented.

While the invention has been shown and described with respect to the preferred embodiments, it will be understood by those skilled in the art that various changes and modifications may be made without departing from the spirit and scope of the invention as defined in the following claims.

The invention claimed is:

1. A method of operating and fueling a liquefied gas carrier having a fuel supply apparatus which includes a cargo tank, a compressor for compressing gas fuel comprising a natural boiled-off gas naturally evaporated in the cargo tank into a high pressure to store the gas fuel, a compressed gas storage tank being filled with the compressed high-pressure gas fuel compressed by the compressor, a decompressor adapted to decompress the high-pressure gas fuel drawn from the compressed gas storage tank into a pressure to be used in the propulsion system when the propulsion system is re-operated, to supply fuel to the propulsion system, a first pipe extending from the cargo tank for connecting the cargo tank to the propulsion system, a first valve which selectively opens or closes the first pipe and is located in the first pipe, a second pipe which branches off from the first pipe upstream of the first valve and is connected to the compressor, a second valve located in the second pipe upstream of the compressor, a third pipe extending from the compressor to the compressed gas storage tank, a third valve which selectively opens or closes the third pipe and is located in the third pipe downstream of the compressor, a fourth pipe which branches off from the third pipe between the third valve and the compressed gas storage tank and is connected to the decompressor, and a fourth valve located in the fourth pipe upstream of the decompressor, the first pipe downstream of the first valve being connected to the fourth pipe downstream of the decompressor, the method comprising:

mooring or anchoring the liquefied gas carrier such that the propulsion system does not require gas fuel; and operating the liquefied gas carrier such that the liquefied gas carrier is no longer moored or anchored, wherein, only during the mooring or anchoring of the liquefied gas carrier such that the propulsion system does not require gas fuel, further comprising:

closing the first valve to stop supply of the gas fuel into the propulsion system and opening the second valve to introduce the natural boiled-off gas into the compressor, compressing the natural boiled-off gas into high pressure in the compressor, opening the third valve and closing the fourth valve to fill the compressed high pressure natural boiled-off gas into the compressed gas storage tank, and storing the compressed high pressure natural boiled-off gas in the compressed gas storage tank, wherein, during the operating of the liquefied gas carrier such that the liquefied gas carrier is no longer moored or anchored, further comprising:

closing the third valve and opening the fourth valve to introduce the compressed high-pressure natural boiled-off gas in the compressed gas storage tank into the decompressor, decompressing the compressed high-pressure natural boiled-off gas introduced from the compressed gas storage tank through the decompressor, and supplying the decompressed natural boiled-off gas decompressed by the decompressor to the propulsion system, and wherein the opening of the third valve and closing of the fourth valve to fill the compressed high pressure natural boiled-off gas into the compressed gas storage tank occurs when the propulsion does not require fuel.

2. The method of claim 1, wherein the gas fuel further comprises at least one of a forced boiled-off gas which is artificially evaporated and a gas additionally supplied for the use of fuel.

3. The method of claim 1, wherein the storing of the compressed high pressure natural boiled-off gas is in the compressed gas storage tank disposed in a space between an engine room of the liquefied gas carrier and the cargo tank.

4. The method of claim 1, wherein the compressing of the natural boiled-off gas into high pressure is in a multistage high-pressure compressor.

5. The method of claim 1, wherein the decompressing of the compressed high-pressure natural boiled-off gas is in a multistage decompressor.

6. The method of claim 1, wherein the storing of the compressed high pressure natural boiled-off gas in the compressed gas storage tank and the supplying of the decompressed natural boiled-off gas decompressed by the decompressor to the propulsion system prevents a need to burn the natural boiled-off gas for regulation of pressure inside the cargo tank.

7. The method of claim 1, further comprising fueling the propulsion system with the decompressed natural boiled-off gas.

8. The method of claim 1, further comprising compressing the natural boiled-off gas into a fuel condition pressure of 6.5 bar in the compressor.

9. The method of claim 1, further comprising fueling a boiler with the decompressed natural boiled-off gas.

10. The method of claim 1, further comprising fueling a dual fuel engine with the decompressed natural boiled-off gas.

\* \* \* \* \*